United States Patent

Kaku et al.

[15] 3,683,049

[45] Aug. 8, 1972

[54] PROCESS FOR PRODUCING DYEABLE POLYOLEFIN

[72] Inventors: Kanji Kaku, 21 Otsumocho; Mitsuo Asaba, 60 Hase Kamakurashi; Yasaka Gondo, 21 Otsutomocho Kanazawaku Yokohamashi; Atsuyuki Kachi, 21 Otsutomocho Kanazawaku Yokohamashi, all of Kanagawaken, 3; Satoshi Matsumoto, 6133-3 Goikawagishi Ichiharashi, Chibaken, all of Japan

[22] Filed: May 24, 1971

[21] Appl. No.: 146,518

Related U.S. Application Data

[62] Division of Ser. No. 778,763, Nov. 25, 1968, abandoned.

[30] Foreign Application Priority Data

Dec. 6, 1967 Japan ......................42/78323
Dec. 6, 1967 Japan ......................42/78324

[52] U.S. Cl. .................260/876 R, 8/21 D, 8/162 R, 8/DIG. 9, 8/DIG. 18, 260/41 C, 260/878 R, 264/78

[51] Int. Cl. ........C08f 29/12, D06p 3/06, C08f 27/00

[58] Field of Search .......................240/876 R, 878 R

[56] References Cited

UNITED STATES PATENTS

| | | | |
|---|---|---|---|
| 3,131,990 | 5/1964 | Bonuicini et al. | 260/878 |
| 3,299,176 | 1/1967 | Longworth | 260/876 |
| 3,493,480 | 2/1970 | Kuroda et al. | 260/876 |

FOREIGN PATENTS OR APPLICATIONS

| | | | |
|---|---|---|---|
| 38/7134 | 5/1963 | Japan | 260/878 |
| 879,195 | 10/1961 | Great Britain | 260/878 |
| 881,374 | 11/1961 | Great Britain | 878/ |

*Primary Examiner*—Murray Tillman
*Assistant Examiner*—Helen W. Roberts
*Attorney*—Fred C. Philpitt

[57] ABSTRACT

Process for producing dyeable polyolefin which comprises graft-copolymerizing a vinyl monomer containing at least one basic nitrogen atom with a polyolefin to an extent more than half the amount to be included in the final graft-copolymerized polymer and then reacting an acidic vinyl compound with thus graft-copolymerized product, preferably in the graft-copolymerizing system. This dyeable polyolefin has excellent dye affinity to acid dyes while retaining excellent mechanical properties of polyolefin.

6 Claims, No Drawings

PROCESS FOR PRODUCING DYEABLE POLYOLEFIN

This is a divisional application of patent application Ser. No. 778,763 filed on Nov. 25, 1968, now abandoned.

This invention relates to a process for producing dyeable polyolefins. More particularly this invention relates to polyolefins having improved hydrophilic properties and excellent dye affinity to acid dyes.

In spite of superior physical properties of polyolefins, their dyeability is inferior because they have no functional groups in their molecules which can act as dye-sites.

Various attempts to introduce functional groups, have been made in order to improve the dyeability of polyolefins. For example, there have been known various methods such as blending of polymer or polymers containing functional group or groups, graft-copolymerization of monomers, direct introduction of functional group or groups to a polyolefin molecule by chemical agent, or the like.

However, when these known methods are used, it sometimes happens that inherent superior physical properties of polyolefins are injured and moreover even when a certain extent of improvement in dyeability is achieved to disperse dyes and basid dyes, sufficient result cannot always be attained by acid dyes.

It has been found that the presence of basic dye-sites in polyolefin is necessary to make it dyeable to acid dyes but simple provisions of such sites alone is not satisfactory. Its reason is considered to lie in that dye-sites are in the state surrounded by hydrophobic polyolefin molecules and the access of hydrophilic dye molecules is prevented.

In order to overcome such a drawback, some processes e.g. treatment of the surface of shaped articles with acidic chemical agents for the purpose of providing hydrophilic property, treatment of shaped articles containing soluble matter with a solvent to dissolve easily soluble matter out and utilization of capillary remained after dissolution of easily soluble matter as a route of approach for dyes, have been known. However, all these methods are used to treat shaped articles and it is a drawback of these methods that the effect is lost when they are applied to the material before shaping and undergo such steps as heating, melting, shaping, or the like. It is also a drawback of these methods that the shaping is difficult.

For example, the official gazett of Japanese patent publication No. 9548/1966 discloses a method which relies on blending a small amount of polyamide with poly r olefin and treating the shaped articles obtained from resultant blend with acidic chemical agents. However, the inventors of the present invention have found that when the treatment with acidic chemical agents is applied to resins before melt-shaping instead of to the shaped articles in the above-mentioned method, melt shaping of thus treated resins is difficult or even when the shaping is possible the dyeability acquired is considerably lost.

As a method which has no above-mentioned disadvantage and has some similarity to the art of the present invention, a method described in the official gazette of Japanese patent publication No. 7134/1963 has been known. This method relies on a mixed graft polymerization which applies, to polypropylene, simultaneously a vinyl monomer containing at least one basic nitrogen atom, one or more of monomers selected from the group consisting of methyl methacrylate, methyl acrylate and styrene, and a vinyl monomer containing carboxylic group or sulfonic acid group. However, since the monomer used consists of three or more or monomers having different graft polymerization velocities and particularly when the polymerization velocity of a vinyl monomer containing at least one basic nitrogen atom is slow, it is necessary to increase the total amount of comonomers to be grafted in order to increase the amount of the said vinyl monomer to be introduced. This results in such a disadvantage as the reduction of an inherent physical property of polypropylene.

Moreover, the use of methyl methacrylate, methyl acrylate, styrene, or the like is itself not economically advantageous.

An object of the present invention is to provide a process for producing dyeable polyolefins which have sufficient dye-affinity even after they undergo operations, such as heating, melting, shaping, etc., in order to overcome the above-mentioned drawback of the conventional methods.

Another object of the present invention is to provide a process for dyeable polyolefins having dye-affinity to dyes, particularly to acid dyes.

Further objects and advantages will be apparent from the description which hereinafter follows.

The present invention consists in a method which comprises graft-copolymerizing a vinyl monomer containing at least one basic nitrogen atom with a polyolefin to an extent more than half the amount to be included in the final graft-copolymerized polymer and then reacting an acidic vinyl compound to the graft-copolymerized product, preferably in the graft-copolymerizing system.

By way of the above-mentioned procedure, it is believed that basic groups introduced at first and the acid groups subsequently introduced, form ion-pairs, salts or other complex and the polyolefin turns to acquire a high molecular weight electrolytic property which gives such appropriate basic and hydrophilic property that the access and the combination of dyes, i.e. acid dyes is possible.

For comparison's sake, the grafting of a vinyl monomer containing at least one basic nitrogen atom and the action of acidic vinyl compound are simultaneously carried out, but it has been found that the dyeability of resultant polyolefin is extremely inferior to that of the product of the present invention.

Thus there is a significant meaning in the order or time of grafting of a vinyl monomer containing at least one basic nitrogen atom, and action of an acidic vinyl compound in the present invention. Accordingly, so far as the above-mentioned condition is satisfied, there is no limitation carrying out the graft-copolymerization of a vinyl monomer containing at least one basic nitrogen atom as to the coexistence of another neutral vinyl monomer, e.g. methyl methacrylate ethyl acrylate, styrene, acrylonitrile, etc.

As a vinyl monomer containing at least one basic nitrogen atom vinyl pyridines, such as 2-vinyl pyridine, 4-vinyl pyridine, 2-methyl-5-vinyl pyridine, propenyl pyridine, etc., N-vinyl cyclic lactams, such as vinyl pyrrolidone, vinyl piperidone, etc., those having a substituent containing vinyl radical in imidazole-, oxazole-, pyrrole- or triazine-ring, N,N-diethyl aminoethyl methacrylate, acrylamide, N-methyl acrylamide, aminostyrene and mixtures of foregoing members are illustrated.

It is preferable to use a vinyl monomer containing at least one basic nitrogen atom in an amount 0.5 to 60 parts by weight based upon the 100 parts by weight of polyolefin. When an amount used is less than 0.5 part by weight, the effectiveness of the present invention regarding dye-affinity is not sufficient, and an amount used is larger than 60 parts by weight, the relative proportion of graft-copolymer is reduced and the proportion of homo-polymer of a vinyl monomer containing at least one basic nitrogen atom is increased; hence is not preferable.

As acidic vinyl compounds, acrylic acid, methacrylic acid, itaconic acid, maleic acid, crotonic acid, styrene p-sulfonic acid, vinyl sulfonic acid and the like are included. An acidic vinyl compound performs not only a function as an acidic compound but also it reacts with polyolefin by grafting; hence it can be combined with polyolefin very firmly.

The reaction time necessary to graft-copolymerizing a vinyl monomer containing at least one basic nitrogen atom to polyolefin in the method of the present invention is preferably about 10 minutes to 5 hours.

Time shorter than 10 minutes is not adequate because the polymerization reaction including grafting reaction does not proceed sufficiently. The reaction longer than 5 hours is not preferable because it does not bring about any advantage. In general, the polymerization of more than half the vinyl monomer containing at least one basic nitrogen atom to be included in the final graft copolymer will be completed in about 10 minutes.

Even at a time, when more than half of the polymerization is attained, it is possible to add an acidic vinyl compound defined in the present invention to the polymerization system to carry out simultaneously the processing of polymerization and the action of acid but a preferable result can be obtained when the action of acid in the step after the polymerization is nearly completed.

Resultant graft-copolymer, preferably in the grafting system can be subjected directly to the action of acidic vinyl compound, as it is, without undergoing the operation of melting, heating, shaping, etc.

There is no limitation as to the amount of acidic vinyl compound used. Sufficient result can be obtained even with such a small amount as less than half the molar equivalent relative to a vinyl monomer containing at least one basic nitrogen atom.

With regard to the method for carrying out graft-copolymerization, various conventional methods e.g. irradiation of ionic radiant ray to the coexisting system of polyolefin and a monomer, heat polymerization of the system in the presence of a radical polymerization initiator such as peroxide, azo compound or the like, a method which relies on causing polyolefin to be peroxidized or hydroperoxidized in advance with an oxidizing agent or to form free radicals of polyolefin by heat or by a mechanical operation and then contacting a monomer therewith to carry out copolymerization can be adopted.

It is also possible to treat polyolefin in advance with an ionic radiant ray or a radical initiator and then contacting a monomer with irradiated polyolefin to carry out graft-copolymerization.

Among graft-copolymerization reactions, a method which relies on suspending or soaking polyolein in water, and carrying out the reaction in the presence of a radical initiator, particularly a radical initiator containing at least one higher alkyl radical having straight chain structure of 5 to 22 carbon atoms in a molecule, gives favorable result. In the suspension or soaking, the presence of an organic solvent and/or a surfactant gives better result.

The present method can be applied to resin, namely its powder before shaping into a shaped product with advantage but it can also be applied to the shaped product.

The polyolefin modified in accordance with the method of the present invention possesses both acidic and basic properties. By the mutual action of these properties, it shows a notable dye-affinity especially to acid dyes.

Acid dyes are most useful dyes in the point of abundance of variety, easiness of availability, simplicity of utilization, superiority of color fastness. It is a notable advantage that the present modified polyolefin can be dyed by such acid dyes with excellent result.

Further the present modified polyolefin contains generally about 2 – 15 percent by weight of the component other than polyolefin. Since the amount is relatively small, there is no apprehension of their mechanical properties being effected.

In the past, the modification of dyeability carried out before shaping is usually lost after the process of heating, melting, shaping, etc. but there is no such drawback according to the present method.

Because of the modification of polyolefin during the step before shaping, the shaping operation of various articles has become easier. Compared with the conventional method which resorts to the acid treatment rendered to the surface of shaped articles, it is an economical advantage that even with a small amount of acid i.e. acidic vinyl compound, the present process can be effectively carried out.

As above-mentioned, the present modified polyolefins show excellent result to acid dyes but also good dyeability to common disperse dyes or basic dyes. Further due to hydrophillic property, they show superior adhesiveness, antistatic property and moderate water absorption (sweat absorption).

The modified polyolefins prepared according to the method of the present invention can be not only used as they are, i.e. solely, but also they can be mixed with unmodified polyolefins to prepare shaped articles in which the effectiveness of the present invention can be fully exhibited.

Following examples are offered by way of illustration. All parts are percentage herein referred to are by weight unless otherwise noted.

EXAMPLE 1

A sospension was prepared by mixing 100 parts of crystalline polypropylene powders (F.R. = 5.2) and 2 parts of distearoyl peroxide, and then adding to the mixture 600 parts of 1 percent aqueous solution of Emal 40. After heated to 85° C. in the atmosphere of air, the mixture was further kept at the same temperature for 30 minutes with stirring. The atmosphere in the system was replaced by the atmosphere of nitrogen, while 8 parts of 2-methyl-5-vinylpyridine were added. After the reaction at 85° C. for 2 hours, 8 parts of acrylic acid were added and then subjected to reaction for additional 2 hours to produce a powdery product which will hereinafter be referred to as "stepwise grafted product." According to the analysis, the product had an apparent grafted proportion of 9.5 percent relative to the starting polypropylene used. The extraction-treatment by boiling the above-mentioned product with methanol for 2 hours, followed by repeating this procedure three times, resulted in a grafted proportion of 5.9 percent.

Next, for comparison's sake, an experiment was carried out by simultaneously adding 8 parts of 2-methyl-5-vinylpyridine and 8 parts of acrylic acid, followed by subjecting the resulting mixture to a similar reaction for 4 hours. A powdery product thus obtained which will hereinafter be referred to as "simultaneously grafted product," showed only an apparent grafted proportion of 4.5 percent and a grafted proportion of 2.3 percent.

Further, as an example of grafted copolymer containing no acid component, powdery products which will hereinafter be referred to as "solely grafted product A or B" were obtained by adding 8 parts or 16 parts of 2-methyl-5-vinylpyridine, followed by subjecting each of the above-mentioned mixtures to a similar reaction for 4 hours.

The solely grafted product A had an apparent grafted proportion of 6.4 percent and a grafted proportion of 2.4 percent, while the solely grafted product B had an apparent grafted proportion of 15.1 percent and a grafted proportion of 7.9 percent.

From the above-mentioned stepwise grafted product, simultaneously grafted product, solely grafted product and powders obtained by subjecting each of them to the extraction-treatment with methanol, were prepared films having each a thickness of about 80$\mu$, under the conditions of 200° C., atmospheric pressure for 30 seconds and then a pressure of 50 kg/cm$^2$ for 90 seconds. They were dyed with Acilan Scarlet A, Aizen Tartrazinc Conc., Brillant Wool Blue FFR and Carbolan Green G125 as acid dyes; Rhodamin B Conc. as a basic dye; and Celliton Fast Rubin B as a disperse dye.

The results are shown in Table 1.

TABLE 1

| Dye | Stepwise grafted product and extraction-treated product | Simultaneously grafted product and extraction-treated product | Solely grafted product and extraction-treated product |
|---|---|---|---|
| Acilan scarlet A* | ◎ | X | ○* |
| Aizen tartrazinc conc.* | ◎ | X | ○* |
| Brilliant wool blue FFR* | ◎ | X | ○* |
| Carbolan green G125* | ◎ | X | * |
| Rhodamin B conc.** | ◎ | ○ | △ |
| Celliton fast rubin B*** | ◎ | △ | ◎ |

Also, the fastnesses (to washing and to light of the dyed films obtained from the stepwise grafted product and the extraction-treated product, were all good in the dyeing with any dyes, and in particular, so excellent as to be sufficient for practical use, in the dyeing with acid dyes.

*Acid dye. ◎ Deep color. △ Faintly dyed.
**Basic dye. ○ Moderate color. X Not dyed at all.
***Disperse dye. ○* Moderate color, darkish.

The dyeing conditions were as follows:
Dyeing concentration, 10% owf.
Liquor ratio, 100.
PH in dyeing bath, 3 (in case of acid dyes), Neutral (in cases of basic and disperse dyes).
Dyeing temperature, 100° C.
Dyeing period, one hour.

An aqueous solution of S courol 900 made by Kao Soap Co. (2 g/l) was used in the dyeing bath. Dyed films were then washed by crumpling with acetone and evaluated.

EXAMPLE 2

A stepwise grafted product and a mimultaneously grafted product were obtained in the same way as in Example 1, except that 4 parts of 2-vinylpyridine were used in place of 8 parts of 2-methyl-5-vinylpyridine, and 4 parts of methacrylic acid were used in place of 8 parts of acrylic acid.

The stepwise grafted product had an apparent grafted proportion of 7.1 percent and a grafted proportion of 4.0 percent, while the simultaneously grafted product had the proportion of 4.0 percent and 2.2 percent, respectively.

Films shaped under the pressure and melting in the same way as in Example 1, were dyed under the same conditions. Thus, the stepwise grafted product was dyed deeply and fast with any dyes containing acid dyes, whereas the simultaneously grafted product was not dyed at all with acid dyes, and dyed moderately with basic and disperse dyes.

EXAMPLE 3

100 parts of crystalline polypropylene (F.R. = 5.4) and one part of dilauroyl peroxide were suspended in 600 parts of 1 percent aqueous solution of Emale 40. After heated to 85° C. in the atmosphere of air, the suspension was further kept at the same temperature for 30 minutes with stirring. The atmosphere in the system was then replaced by nitrogen, while 8 parts of 4-vinylpyridine were added and subjected to reaction for 2 hours, and thereafter 4 parts of acrylic acid were added and further subjected to reaction for 2 hours. Thus, a powdery grafted product having an apparent grafted proportion of 9.8 percent was obtained.

It was melt-extruded at 200° – 240° C. and pelletized, followed by spinning at a spinning temperature of 260° C. and subsequent stretching by 3 times at 90°–130° C. Thus, fibers having 12 deniers per monofilament were obtained, and had following properties; strength, 4.5 g/d; elongation, 44 percent; and thermal shrinkage, 2.0 percent.

The fibers were then dyed with the same dyes as those described in Example 1, under the same dyeing conditions. Thus, they were dyed deeply with all acid dyes, and also, with any of basic and disperse dyes.

Further, from a blend of 50 parts of the pellets obtained above and 50 parts of pellets of unmodified polypropylene (F.R. = 6.2). fibers having properties of 8 deniers per monofilament; strength of 5.1 g/d; elongation of 62 percent; and thermal shrinkage of 3.6 percent, were prepared under the same spinning and stretching conditions. When subjected to a similar dyeing, they were dyed deeply with acid, basic and disperse dyes. This means that the modified polypropylene according to the present invention does not lose its effectiveness to dyeing even in the case of the blending thereof with unmodified polypropylene.

Still further, a comparative test was carried out to demonstrate the effectiveness of the acid component, i.e. acrylic acid. First, a powdery product was obtained in the same way as in the preparation of the above-mentioned grafted product, except that 4 parts of styrene were used in place of 4 parts of acrylic acid. The product was then subjected similarly to pelletizing, spinning and stretching. Thus, fibers having properties of 10 deniers per monofilament; strength of 4.6 g/d; elongation of 53.6 percent; and thermal shrinkage of 3.8 percent, were obtained. When subjected to the dyeing with the dyes described in Example 1, they were dyed most deeply with the disperse dye; but, faintly with the basic dye; and moderately with the acid dyes.

Also, these fibers were allowed to stand for 72 hours in the atmosphere at 25° C. and having a relative humidity of 75 percent to compare their hydroscopicities. Thus, that of the fibers prepared from the stepwise grafted product of 4-vinylpyridine and acrylic acid was 1.3 percent, while that of the fibers prepared from the stepwise grafted product of 4-vinylpyridine and styrene was only about 0.1 percent. From this fact, it can be seen that the modified polypropylene according to the present invention has a considerable hydroscopicity and is useful as fibers for bed clothes and clothings.

EXAMPLE 4

A powdery product (A) having an apparent grafted proportion of 7.5 percent and a grafted proportion of 4.3 percent, was obtained in the same way as in Example 1, excepting that 4 parts of 4-vinylpyridine were used in place of 8 parts of 2-methyl-5-vinylpyridine, and 4 parts of acrylic acid were used in place of 8 parts of acrylic acid.

Further, a powdery product (B) having an apparent grafted proportion of 6.4 percent and a grafted proportion of 3.7 percent, was obtained in the same way as in the above-mentioned, except that 4 parts of styrene were used in place of 4 parts of acrylic acid. Another powdery product (C) having an apparent grafted proportion of 6.0 percent and a grafted proportion of 2.4 percent, was obtained also in the same way as in the above-mentioned, except that 2 parts of styrene and 2 parts of acrylic acid were simultaneously used in place of 4 parts of acrylic acid.

From these products (A), (B) and (C), films were prepared in the same procedure as in Example 1 and dyeing tests were carried out with the same acid, basic and disperse dyes and under the same dyeing conditions as described in Example 1.

Thus, with the acidic dyes, the films from (A) and (C) were dyed deeply, but the films from (B) were dyed moderately with darkish tone. With the basic dye, those from (A) and (C) were dyed considerably deeply, but those from (B) were scarecely dyed, and with the disperse dye, any of the three were dyed deeply, and above all, those from (B) were deeply dyed in particular.

A sheet having a thickness of 0.3 mm was prepared under the same conditions as in the preparation of films from the above-mentioned each powdery product. Melamic 1200 Clear made by Nippon Paint Co., Ltd. and Urethas 300 made by To a Chemical Co., Ltd. were coated on the sheets. Indentations were then cut into it by means of razor blade so that 100 squares having each an area of 1 $mm^2$ could be made within an area of 1 $cm^2$. Thus, the peeling-off degree of the coatings was examined by adhering thereto Cellotape which is a trade name of an adhesive-coated cellophane tape made by Nichiban Co., Ltd., followed by peeling the tape off the sheet toward the direction of 180° C. Thus, in the cases derived from (A) and (C), the numbers of non-peeled off squares were more than 98, in regard to any of the coatings, while, in the case derived from (B), the numbers were zero in regard to any of the coatings.

EXAMPLE 5

A suspension was prepared from 100 parts of polyethylene powders ($[\eta] = 3.2$) obtained by the use of Ziegler-Natta catalyst and one part of dilauroyl peroxide, in 600 parts of 1 percent aqueous solution of Emal 40. The suspension was then heated to 85° C. for 30 minutes with stirring in the atmosphere of air, and thereafter 5 parts of 2-isopropenylpyridine were added and subjected to reaction for 2 hours. Subsequently, a mixture of 3 parts of vinyl sulfonic acid and 2 parts of acrylonitrile was added and subjected to reaction for 2 hours. Thus, a powdery product having an apparent grafted proportion of 7.7 percent and a grafted proportion of 4.8 percent was obtained. From this product was prepared films having a thickness of 80$\mu$, and they were then dyed with the dyes and under the dyeing conditions, as described in Example 1. Thus, they were dyed deeply with any of the acid, basic and disperse dyes.

EXAMPLE 6

A powdery product (A) having an apparent grafted proportion of 7.3 percent and a grafted proportion of 4.7 percent, was obtained in the same way as in Example 1, except that 4 parts of 2-methyl-5-vinylpyridine were used in place of 8 parts of 2-methyl-5-vinylpyridine, and 4 parts of acrylic acid were used in place of 8 parts of acrylic acid.

Further, another powdery product (B) having an apparent grafted proportion of 6.0 percent and a grafted proportion of 2.0 percent, was obtained in the same way as in Example 1, except that 4 parts of 2-methyl-5-vinylpyridine, 4 parts of styrene and 4 parts of acrylic acid were simultaneously added in place of 8 parts of 2-methyl-5-vinylpyridine, and subjected to reaction for 4 parts, without following by the use of acrylic acid. These powdery products (A) and (B) were subjected to film-shaping and dyeing in the same way as described in Example 1. Thus, the films prepared from (A) according to the present invention were dyed clearly and deeply with all of the acid dyes, whereas the films prepared from (B) were markedly inferior to those prepared from (A), both in dept and cleaness. However, with the disperse and basic dyes, those from (A) and those from (B), both were dyed deeply to the same extent.

EXAMPLE 7

A powdery product having an apparent grafted proportion of 7.5 percent and a grafted proportion of 6.1 percent, was obtained in the same way as in Example 1, except that 8 parts of 4-vinylpyridine were used in place of 8 parts of 2-methyl-5-vinylpyridine, and 2 parts of acrylic acid were used in place of 8 parts of acrylic acid. The films prepared from this product were dyed extremely deeply with the acid dyes, and also deeply with the disperse and basic dyes.

EXAMPLE 8

100 parts of crystalline polypropylene powders (F.R. = 5.2) and 2 parts of distearoyl peroxide were mixed with stirring in the absence of solvent and heated to 85° C. 8 parts of 2-methyl-5-vinyl-pyridine were then added and subjected to reaction for 2 hours in the atmosphere of nitrogen. Thereafter, 8 parts of acrylic acid were added and further subjected to reaction for 2 hours. Unchanged monomers were then removed by maintaining the pressure in the system under a reduced pressure below 5 mm Hg. Thus, a powdery product having an apparent grafted proportion of 14.1 percent and a grafted proportion of 9.6 percent, was obtained.

Films which were prepared from this product and the product treated by the extraction using the same procedure as described in Example 1, were dyed extremely deeply with any of the acid dyes. They were dyed deeply also with the disperse and basic dyes.

EXAMPLE 9

A grafted product was obtained in the same way as in Example 1, except that the use amounts of 2-methyl-5-vinylpyridine (MVP) and acrylic acid (AAc) as well as the time intervals of their addition were altered as shown in the following Table. Films were prepared and subjected to the examination of dyeabilitites with the acid dyes, in the same way as described in the Example 1. The results are shown in the following Table 2.

product which was obtained by simultaneously adding and mixing each amounts of the above-mentioned monomers, followed by subjecting to reaction for 4 hours.

What is claimed is:

1. In the process of graft-copolymerizing a polyolefin with a vinyl monomer having at least one basic nitrogen atom wherein:

a. said vinyl monomer is selected from the group consisting of 2-vinylpyridine, 4-vinylpyridine, 2-methyl-5-vinylpyridine, propenylpyridine, vinylpyrrolidone, vinylpiperidone, a vinyl-substituted imidazole, a vinyl-substituted oxazole, a vinyl-substituted pyrrole, a vinyl-substituted triazine, N,N-dimethyl aminoethyl methacrylate, acrylamide, N-methyl acrylamide, aminostylene and mixtures of the foregoing members, b. said polyolefin is selected from the group consisting of polypropylene and polyethylene and c. the ratio of said vinyl monomer to said polyolefin is within the range of about 0.5 to 60 parts by weight of vinyl monomer per 100 parts by weight of polyolefin, the improvement which comprises:

1. causing said graft-copolymerization to proceed until more than half of the final vinyl monomer content of the recovered graft copolymer has been graft-copolymerized, and then 2. introducing an acidic vinyl compound into the graft copolymerization system before the graft-copolymerization resultant is separated from the graft-copolymerization system, and reacting the thus introduced acidic vinyl compound with the graft-copolymerization product, and

TABLE 2

| | | | | Percent | | | Dyeability with acid dye | |
|---|---|---|---|---|---|---|---|---|
| Base/Acid | Amount (part) | Mol ratio | Time interval of addition (minute) | Conversion rate of monomers to polymer | Apparent grafted proportion | Grafted proportion | Pre-extraction | Post extraction |
| MVP/AAc | 40/40 | 0.6/1 | 0 | 4.5 | 3.7 | 2.2 | 0 | 0 |
| MVP/AAc | 8/4 | 1.1/1 | 0 | 40.3 | 4.8 | 2.5 | 0 | 0 |
| MVP/AAc | 30/10 | 1.7/1 | 10 | 39.6 | 15.6 | 6.1 | >3 | 0 |
| MVP/AAc | 15/10 | 0.9/1 | 120 | 62.9 | 15.6 | 13.3 | >3 | >3 |
| MVP/AAc | 8/4 | 1.1/1 | 120 | 60.8 | 7.2 | 3.0 | 3 | 3 |

NOTE.—Dyeabilities: 0=not dyed; 1=faintly dyed; 2=moderately dyed; 3=deeply dyed.

It can be seen from the Table that, in the case of simultaneous grafting (the time interval of addition is zero) or shorter time interval of addition, the grafted proportion is lower and the dyeability also is inferior. This seems to be due to the fact that the formation of a salt between the basic monomer and the acid monomer, followed by the dissolution of the salt into aqueous medium or the ionic dissociation thereof, which results in such a lower polymerization activity, that polymerization does not occur so much. Example 10

Films were prepared from a powdery product obtained in the same way as in Example 1, except that 4 parts of 2-methyl-5-vinyl-pyridine and 1.8 parts of styrene were used in place of 8 parts of 2-methyl-5-vinylpyridine, and 4 parts of acrylic acid and 1.8 parts of styrene were used in place of 8 parts of acrylic acid.

These films were dyed deeply with the acid dyes, compared with the films prepared from a powdery 3. recovering a graft-polymerization product having excellent dye affinity to acid dyes.

2. A process according to claim 1 wherein said acidic vinyl compound is selected from the group consisting of acrylic acid, methacrylic acid, itaconic acid, maleic acid, crotonic acid, styrene p-sulfonic acid, vinyl sulfonic acid.

3. A process according to claim 1 wherein said graft-copolymerizing is carried out in the presence of an radical initiator having at least one higher alkylradical of straight chain structure containing five to 22 carbon atoms.

4. A process according to claim 1 wherein said graft copolymerizing is carried out in the presence of an radical initiator and in the state of an aqueous dispersion of polyolefin.

5. A dyeable polyolefin obtained according to the method of claim 1.

6. A dyeable polyolefin composition which comprises a dyeable polyolefin obtained according to the process of claim 1 and an unmodified polyolefin, the ratio the former to the latter being about (1 : 6) or more, and wherein said unmodified polyolefin is selected from the group consisting of polypropylene or polyethylene.

* * * * *